US009467949B2

(12) United States Patent
Pan et al.

(10) Patent No.: US 9,467,949 B2
(45) Date of Patent: Oct. 11, 2016

(54) POWER CONTROL METHOD, APPARATUS, AND SYSTEM (71) Applicant: HUAWEI TECHNOLOGIES CO., LTD., Shenzhen, Guangdong (CN)

(72) Inventors: Yongchao Pan, Shanghai (CN); Bitao Li, Shanghai (CN); Liang Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 14/448,191

(22) Filed: Jul. 31, 2014

(65) Prior Publication Data

US 2014/0342769 A1 Nov. 20, 2014

Related U.S. Application Data (63) Continuation of application No. PCT/CN2013/075980, filed on May 21, 2013.

(30) Foreign Application Priority Data

May 21, 2012 (CN) .......................... 2012 1 0157746

(51) Int. Cl.
H04B 7/00 (2006.01)
H04W 52/04 (2009.01)
(Continued)

(52) U.S. Cl.
CPC ........... *H04W 52/04* (2013.01); *H04W 52/146* (2013.01); *H04W 52/247* (2013.01); *H04W 52/325* (2013.01); *H04W 52/386* (2013.01)

(58) Field of Classification Search
USPC ........................................................ 455/522
See application file for complete search history.

(56) References Cited

U.S. PATENT DOCUMENTS

2007/0149238 A1* 6/2007 Das ....................... H04W 52/16
455/522
2007/0249360 A1* 10/2007 Das .......................... H04L 47/10
455/450

(Continued)

FOREIGN PATENT DOCUMENTS

CN 101341667 1/2009
CN 101447810 6/2009

(Continued)

OTHER PUBLICATIONS

International Search Report, dated Aug. 29, 2013, in corresponding International Application No. PCT/CN2013/075980 (12 pp.).

(Continued)

*Primary Examiner* — Ankur Jain
(74) *Attorney, Agent, or Firm* — Staas & Halsey LLP (57) ABSTRACT Embodiments of the present invention relate to the field of communications, and provide apparatus which can improve performance of power control on a user who accesses a signal processing entity not supporting a real-time power control function. The apparatus includes: receiving a first signal sent by a first user who accesses a signal processing entity not supporting the real-time power control function; receiving an instruction which is for processing a control channel signal and is sent by a control apparatus, and setting up a channel for bearing the control channel signal of the first signal; and processing the control channel signal which is of the first signal and is borne by the channel, and generating a detection result of the control channel signal which is of the first signal and is borne by the channel. The embodiments of the present invention are applied for real-time power control on the user.

1 Claim, 6 Drawing Sheets (51) Int. Cl.
*H04W 52/14* (2009.01)
*H04W 52/24* (2009.01)
*H04W 52/32* (2009.01)
*H04W 52/38* (2009.01)

(56) References Cited

U.S. PATENT DOCUMENTS

2011/0190026 A1   8/2011  Nishikawa et al.
2011/0190028 A1*  8/2011  Hahn ............... H03F 1/345
                                            455/550.1

FOREIGN PATENT DOCUMENTS

CN   102026349   4/2011
CN   102695260   9/2012

OTHER PUBLICATIONS

International Search Report, dated Aug. 29, 2013, in corresponding International Application No. PCT/CN2013/075980 (4 pp.).

* cited by examiner

POWER CONTROL METHOD, APPARATUS, AND SYSTEM

CROSS-REFERENCE TO RELATED APPLICATIONS

This application is a continuation of International Application No. PCT/CN2013/075980, filed on May 21, 2013, which claims priority to Chinese Patent Application No. 201210157746.4, filed on May 21, 2012, both of which are hereby incorporated by reference in their entireties.

TECHNICAL FIELD

Embodiments of the present invention relate to the field of signal processing, and in particular, to a power control method, apparatus, and system.

BACKGROUND

In a mobile communications system, because air interface channel fading changes with time, an inner-loop power control (inner-loop power control) function of a signal processing entity adjusts transmit power at a sending end in real time according to a signal-to-noise ratio of a signal at a receiving end, thereby ensuring that the signal-to-noise ratio of the signal at the receiving end remains stable at a set level, to achieve an objective of anti channel fading, and improve demodulation performance of the receiving end. For signal processing entities in a current system, each of different signal processing entities independently performs the function of inner-loop power control of a user signal that accesses the entity, so as to compensate for an impact of channel fading on power detection performance of the user signal through the inner-loop power control as far as possible.

However, in the prior art, the inventor finds that, due to a processing resource limitation or a processing load balance constraint or the like of a user at the receiving end, detection of different user signals in the system may be implemented in the different signal processing entities; additionally, due to a configuration or a constraint between the different signal processing entities (for example, a gain of a certain function needs to be shared between the entities), part of signal processing entities may not support a real-time power control function, so that inner-loop power control of user signals that access the signal processing entities cannot compensate for loss caused by the air interface channel fading by adjusting the transmit power of the sending end in real time, thereby reducing power control performance.

SUMMARY

A power control method, apparatus, and system provided by embodiments of the present invention can adjust transmit power of a user in real time, and improve performance of power control on a user who accesses a signal processing entity not supporting a real-time power control function.

In one aspect, a signal processing entity is provided, where the signal processing entity supports a real-time power control function, and includes:

a second user signal receiving unit, configured to receive a first signal sent by a first user, where the first user is a user who accesses a signal processing entity not supporting the real-time power control function, and the first signal is a signal sent by the first user to the signal processing entity supporting the real-time power control function;

a control channel setup unit, configured to receive an instruction which is for processing a control channel signal of the first signal and is sent by a control apparatus, and set up, according to the instruction, for the first user, a channel for bearing the control channel signal of the first signal; and a control signal detecting unit, configured to process the control channel signal which is of the first signal and is borne by the channel, and generate a detection result of the control channel signal which is of the first signal and is borne by the channel, so that the signal processing entity supporting the real-time power control function performs real-time power control on the first user according to the detection result.

In one aspect, a control apparatus is provided and includes:

a first user signal receiving unit, configured to receive a second signal sent by a first user, where the first user is a user who accesses a signal processing entity not supporting a real-time power control function, and the second signal is a signal sent by the first user to the control apparatus; and a control channel instructing unit, configured to send, according to the second signal sent by the first user, an instruction for processing a control channel signal of a first signal to a signal processing entity supporting the real-time power control function, so that the signal processing entity supporting the real-time power control function performs real-time power control on the first user.

In another aspect, a power control system is provided and includes a control apparatus, a signal processing entity supporting a real-time power control function, and a signal processing entity not supporting the real-time power control function, where the control apparatus is configured to receive a second signal sent by a first user, where the first user is a user who accesses the signal processing entity not supporting the real-time power control function; send, according to the second signal sent by the first user, an instruction for processing a control channel signal of a first signal to the signal processing entity supporting the real-time power control function, so that the signal processing entity supporting the real-time power control function performs real-time power control on the first user, where the first signal is a signal sent by the first user to the signal processing entity supporting the real-time power control function, and the second signal is a signal sent by the first user to the control apparatus;

the signal processing entity supporting the real-time power control function is configured to receive the first signal sent by the first user, receive the instruction which is for processing the control channel signal of the first signal and is sent by the control apparatus, and set up, according to the instruction, for the first user, a channel for bearing the control channel signal of the first signal; and process the control channel signal which is of the first signal and is borne by the channel, and generate a detection result of the control channel signal which is of the first signal and is borne by the channel, so that the signal processing entity supporting the real-time power control function performs real-time power control on the first user according to the detection result; and the signal processing entity not supporting the real-time power control function is configured to receive a third signal sent by the first user, and process each channel signal of the third signal sent by the first user, where the third signal is a signal sent by the first user to the signal processing entity not supporting the real-time power control function.

In still another aspect, a power control method is provided and includes:

receiving, by a signal processing entity supporting a real-time power control function, a first signal sent by a first user, where the first user is a user who accesses a signal processing entity not supporting the real-time power control function, and the first signal is a signal sent by the first user to the signal processing entity supporting the real-time power control function;

receiving, by the signal processing entity supporting the real-time power control function, an instruction which is for processing a control channel signal of the first signal and is sent by a control apparatus, and setting up, according to the instruction, for the first user, a channel for bearing the control channel signal of the first signal; and processing, by the signal processing entity supporting the real-time power control function, the control channel signal which is of the first signal and is borne by the channel, and generating a detection result of the control channel signal which is of the first signal and is borne by the channel, so that the signal processing entity supporting the real-time power control function performs real-time power control on the first user according to the detection result.

A power control method is further provided and includes:

receiving, by a control apparatus, a second signal sent by a first user, where the first user is a user who accesses a signal processing entity not supporting a real-time power control function, and the second signal is a signal sent by the first user to the control apparatus; and sending, by the control apparatus, according to the second signal sent by the first user, an instruction for processing a control channel signal of a first signal to a signal processing entity supporting the real-time power control function, so that the signal processing entity supporting the real-time power control function performs real-time power control on the first user.

In the power control method, apparatus, and system provided by the embodiments of the present invention, a channel for performing power control on a user is set up, in a signal processing entity supporting a real-time power control function, for the user who accesses a signal processing entity not supporting the real-time power control function, so as to improve performance of power control on the user who accesses the signal processing entity not supporting the real-time power control function, thereby reducing an impact of channel fading on power detection performance of the user signal.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
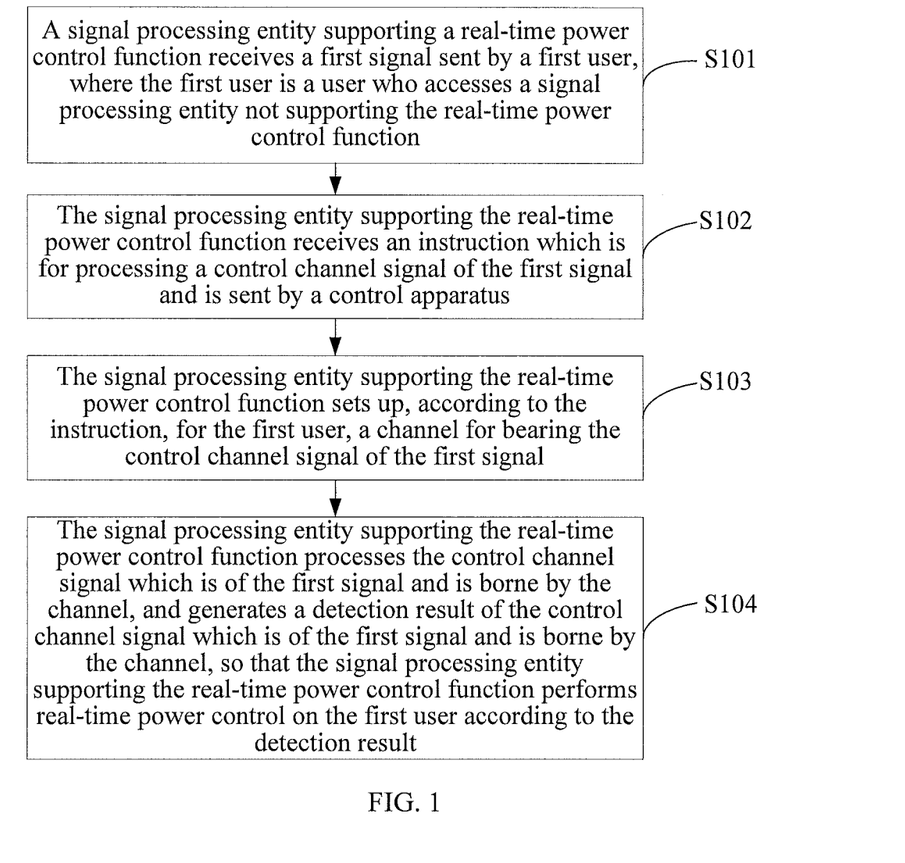
FIG. 1 is a schematic flow chart of a power control method according to an embodiment of the present invention.

A power control method provided by an embodiment of the present invention may, as shown in FIG. 1, include:

S101: A signal processing entity supporting a real-time power control function receives a first signal sent by a first user, where the first user is a user who accesses a signal processing entity not supporting the real-time power control function.

The first signal here is a signal sent by the user who accesses the signal processing entity not supporting the real-time power control function to the signal processing entity supporting the real-time power control function.

It can be understood that, the signal processing entity supporting the real-time power control function also receives a signal sent by a user who accesses the signal processing entity supporting the real-time power control function, and the signal may be called a normal signal. The signal processing entity supporting the real-time power control function processes the normal signal in a normal way, for example, demodulates a data channel signal of the normal signal to generate a signal detection signal, and demodulates and decodes a control channel signal of the normal signal to generate a control channel detection result, so as to achieve an objective of implementing, according to the control channel detection result, real-time power control on the user who accesses the signal processing entity supporting the real-time power control function; there may be multiple manners for performing power control on a user here, for example, by referring to the prior art, a signal-to-noise ratio generated according to the control channel detection result may be compared with a target signal-to-noise ratio to generate a gain coefficient, and the gain coefficient is configured to a user equipment, so as to implement real-time adjustment of sending power of the user, thereby improving signal quality, which is not repeatedly described herein.

S102: The signal processing entity supporting the real-time power control function receives an instruction which is for processing a control channel signal of the first signal and is sent by a control apparatus.

S103: The signal processing entity supporting the real-time power control function sets up, according to the foregoing instruction, for the first user, a channel for bearing the control channel signal of the first signal.

The channel for bearing the control channel signal of the first signal may be called a first channel, and the first channel may, for example, be a dedicated physical control channel (Dedicated physical control channel, DPCCH).

S104: The signal processing entity supporting the real-time power control function processes the control channel signal which is of the first signal and is borne by the foregoing channel (that is, the first channel), and generates a detection result of the control channel signal which is of the first signal and is borne by the first channel (recorded as a control channel detection result), so that the signal processing entity supporting the real-time power control function performs real-time power control on the first user according to the detection result.

It should be noted that, for a method of performing real-time power control on the first user according to the control channel detection result, reference may be made to relevant description in step S101.

The embodiment of the present invention provides the power control method, where a channel for performing power control on a user is set up, in a signal processing entity supporting a real-time power control function, for the user who accesses a signal processing entity not supporting the real-time power control function, so as to adjust transmit power of a first user in real time, and improve performance of power control on the user who accesses the signal processing entity not supporting the real-time power control function, thereby reducing an impact of channel fading on power detection performance of the user signal.

Figure 2:
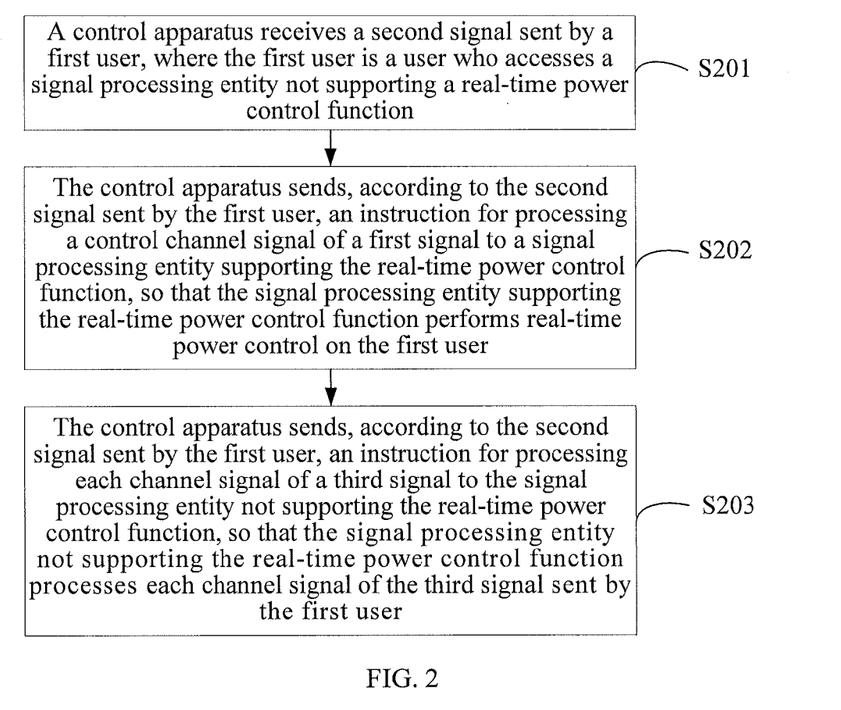
FIG. 2 is a schematic flow chart of another power control method according to an embodiment of the present invention.

A power control method provided by an embodiment of the present invention may, as shown in FIG. 2, include:

S201: A control apparatus receives a second signal sent by a first user, where the first user is a user who accesses a signal processing entity not supporting a real-time power control function.

The second signal here is a signal sent by the first user who accesses the signal processing entity not supporting the real-time power control function to the control apparatus. For explanation about the first user, reference may be made to relevant content of the foregoing embodiment, and details are not repeatedly described herein.

S202: The control apparatus sends, according to the second signal sent by the first user, an instruction for processing a control channel signal of a first signal to a signal processing entity supporting the real-time power control function, so that the signal processing entity supporting the real-time power control function performs real-time power control on the first user.

The embodiment of the present invention provides the power control method, where a channel for performing power control on a user is set up, in a signal processing entity supporting a real-time power control function, for the user who accesses a signal processing entity not supporting the real-time power control function, so as to adjust transmit power of the user in real time, and improve performance of power control on the user who accesses the signal processing entity not supporting the real-time power control function, thereby reducing an impact of channel fading on power detection performance of the user signal.

The method may further include:

S203: The control apparatus sends, according to the second signal sent by the first user, an instruction for processing each channel signal of a third signal to the signal processing entity not supporting the real-time power control function, so that the signal processing entity not supporting the real-time power control function processes each channel signal of the third signal sent by the first user.

The third signal is a signal sent by the first user who accesses the signal processing entity not supporting the real-time power control function to the signal processing entity not supporting the real-time power control function.

Here, the signal processing entity not supporting the real-time power control function simultaneously processes a control channel signal and a data channel signal of the third signal sent by the accessing first user, where a processing result of the control channel signal of the third signal is used to demodulate the data channel signal.

Figure 3:
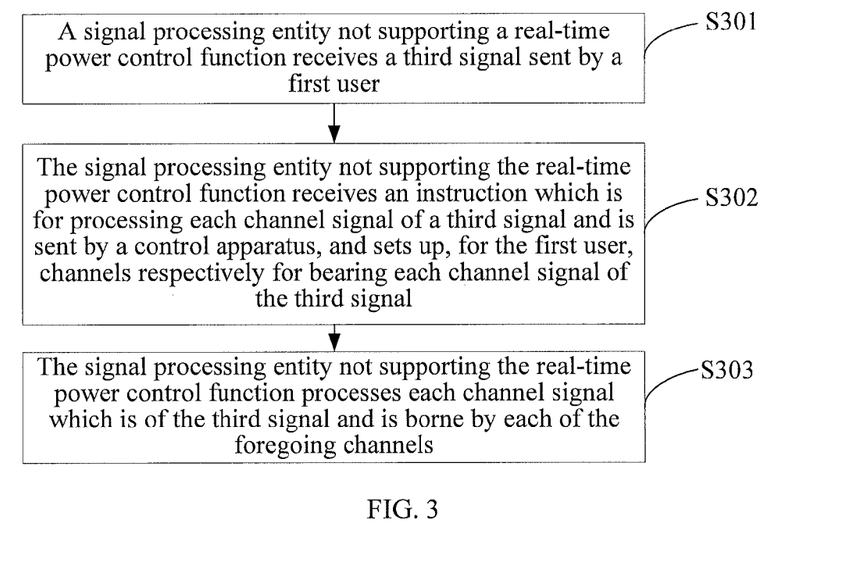
FIG. 3 is a schematic flow chart of still another power control method according to an embodiment of the present invention.

A power control method provided by an embodiment of the present invention may, as shown in FIG. 3, include:

S301: A signal processing entity not supporting a real-time power control function receives a third signal sent by a first user.

Here, a signal sent by the first user who accesses the signal processing entity not supporting the real-time power control function to the signal processing entity not supporting the real-time power control function is called the third signal.

S302: The signal processing entity not supporting the real-time power control function receives an instruction which is for processing each channel signal of the third signal and is sent by a control apparatus, and sets up, for the first user, channels respectively for bearing each channel signal of the third signal.

S303: The signal processing entity not supporting the real-time power control function processes each channel signal which is of the third signal and is borne by each of the foregoing channels.

The signal processing entity not supporting the real-time power control function simultaneously processes a control channel signal and a data channel signal of the third signal sent by the accessing first user, where a processing result of the control channel signal of the third signal is used to demodulate the data channel signal.

Figure 4:
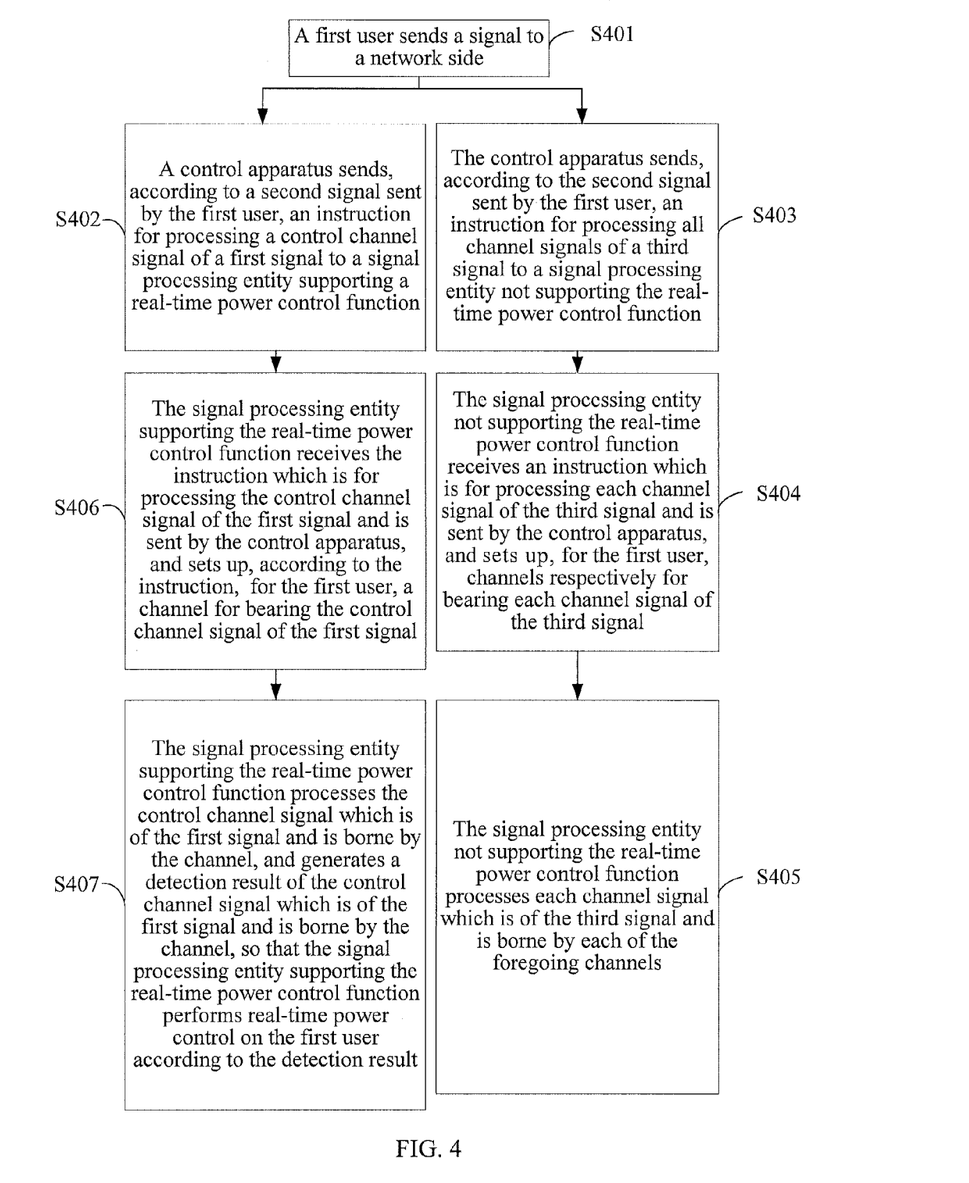
FIG. 4 is a schematic flow chart of a power control method according to another embodiment of the present invention.

A power control method provided by another embodiment of the present invention may, as shown in FIG. 4, include:

S401: A first user sends a signal to a network side.

The first user is a user who accesses a signal processing entity not supporting a real-time power control function, and the network side may include a signal processing entity supporting the real-time power control function, the signal processing entity not supporting the real-time power control function, and a control apparatus, where the signal processing entity supporting the real-time power control function, the signal processing entity not supporting the real-time power control function, and the control apparatus all receive the signal sent by the first user; the signal sent by the first user and received by the signal processing entity supporting the real-time power control function may be called a first signal; the signal sent by the first user and received by the control apparatus may be called a second signal; the signal sent by the first user and received by the signal processing entity not supporting the real-time power control function may be called a third signal; it can be understood that, content of the first signal, the second signal, and the third signal is the same.

S402: The control apparatus sends, according to the second signal sent by the first user, an instruction for processing a control channel signal of the first signal to the signal processing entity supporting the real-time power control function, so that the signal processing entity supporting the real-time power control function performs real-time power control on the first user.

It should be noted that, a result of processing a control channel signal of a user signal by the signal processing entity supporting the real-time power control function may be referred to as a control channel detection result for short; there may be multiple manners for performing power control on a user according to the control channel detection result, for example, by referring to the prior art, a signal-to-noise ratio generated according to the control channel detection result may be compared with a target signal-to-noise ratio to generate a gain coefficient, and the gain coefficient is configured to a user equipment, so as to implement real-time adjustment of sending power of the user, thereby improving signal quality, which is not repeatedly described herein.

S403: The control apparatus sends, according to the second signal sent by the first user, an instruction for processing all channel signals of the third signal to the signal processing entity not supporting the real-time power control function, so that the signal processing entity not supporting the real-time power control function processes each channel signal of the third signal sent by the first user.

S404: The signal processing entity not supporting the real-time power control function receives an instruction which is for processing each channel signal of the third signal and is sent by the control apparatus, and sets up, for the first user, channels respectively for bearing each channel signal of the third signal.

S405: The signal processing entity not supporting the real-time power control function processes each channel signal which is of the third signal and is borne by each of the foregoing channels.

It should be noted here that, the signal processing entity not supporting the real-time power control function also processes a control channel (which may, for example, be a DPCCH (dedicated physical control channel, dedicated physical control channel)) signal in the user signal, but the processing result may not be used for power control of the user signal, that is, the signal processing entity not supporting the real-time power control function does not perform power control processing on the user, but is used to demodulate a data channel signal.

S406: The signal processing entity supporting the real-time power control function receives the instruction which is for processing the control channel signal of the first signal and is sent by the control apparatus, and sets up, according to the instruction, for the first user, a channel for bearing the control channel signal of the first signal.

The channel for bearing the control channel signal of the first signal may be called a first channel, and the first channel may, for example, be a dedicated physical control channel (Dedicated physical control channel, DPCCH).

S407: The signal processing entity supporting the real-time power control function processes the control channel signal which is of the first signal and is borne by the foregoing channel (that is, the first channel), and generates a detection result of the control channel signal which is of the first signal and is borne by the foregoing channel (recorded as a control channel detection result), so that the signal processing entity supporting the real-time power control function performs real-time power control on the first user according to the detection result.

The embodiment of the present invention provides the power control method, where a channel for performing power control on a user is set up, in a signal processing entity supporting a real-time power control function, for the user who accesses a signal processing entity not supporting the real-time power control function, so as to adjust transmit power of the user in real time, and improve performance of power control on the user who accesses the signal processing entity not supporting the real-time power control function, thereby reducing an impact of channel fading on power detection performance of the user signal.

The power control methods provided by the foregoing embodiments are applicable to a mobile communications system in a mode of WCDMA (Wideband Code Division Multiple Access, wideband code division multiple access), TD-SCDMA (Time Division-Synchronous Code Division Multiple Access, time division-synchronous code division multiple access), CDMA2000 (Code Division Multiple Access 2000, code division multiple access 2000), or LTE (Long Term Evolution, long term evolution).

Figure 5:
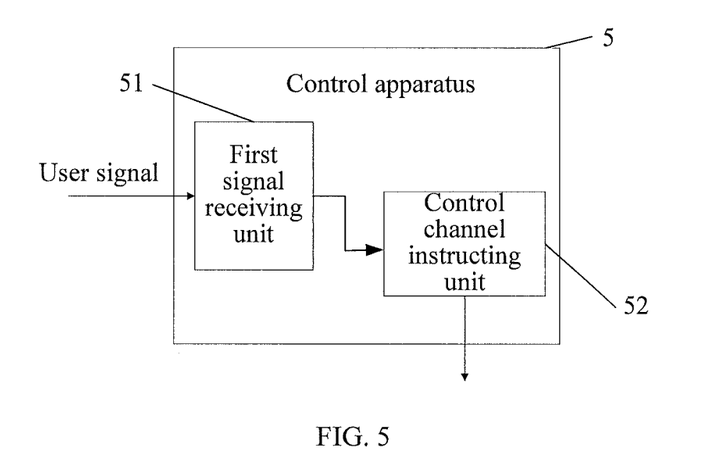
FIG. 5 is a schematic structural diagram of a control apparatus according to an embodiment of the present invention.

The following is an apparatus provided by an embodiment of the present invention, where the apparatus may be applied in the foregoing method embodiments. FIG. 5 shows a control apparatus 5 provided by the embodiment of the present invention, where the control apparatus 5 may include: a first user signal receiving unit 51 and a control channel instructing unit 52.

The first user signal receiving unit 51 is configured to receive a second signal sent by a first user, where the first user is a user who accesses a signal processing entity not supporting a real-time power control function, and the second signal is a signal sent by the first user to the control apparatus.

The control channel instructing unit 52 is configured to send, according to the second signal sent by the first user, an instruction for processing a control channel signal of a first signal to a signal processing entity supporting the real-time power control function, so that the signal processing entity supporting the real-time power control function performs real-time power control on the first user.

The embodiment of the present invention provides the control apparatus, where a channel for performing power control on a user is set up, in a signal processing entity supporting a real-time power control function, for the user who accesses a signal processing entity not supporting the real-time power control function, so as to adjust transmit power of the user in real time, and improve performance of power control on the user who accesses the signal processing entity not supporting the real-time power control function, thereby reducing an impact of channel fading on power detection performance of the user signal.

Figure 6:
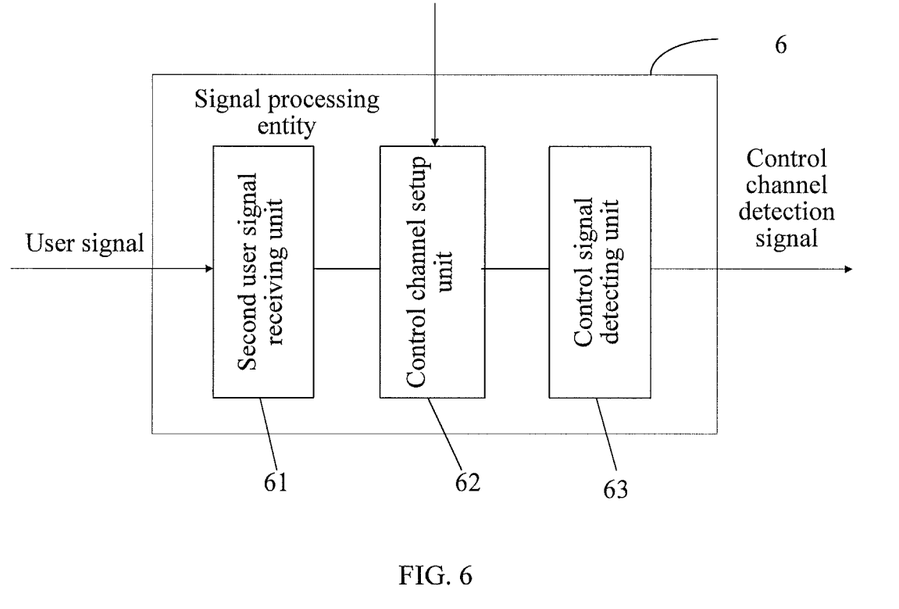
FIG. 6 is a schematic structural diagram of a signal processing entity supporting a real-time power control function according to an embodiment of the present invention.

FIG. 6 is a signal processing entity 6 provided by an embodiment of the present invention, where the signal processing entity 6 is a signal processing entity supporting a real-time power control function, and includes: a second user signal receiving unit 61, a control channel setup unit 62, and a control signal detecting unit 63, where:

the second user signal receiving unit 61 is configured to receive a first signal sent by a first user, where the first user is a user who accesses a signal processing entity not supporting the real-time power control function, and the first signal is a signal sent by the first user to the signal processing entity supporting the real-time power control function;

the control channel setup unit 62 is configured to receive an instruction which is for processing a control channel signal of the first signal and is sent by a control apparatus, and set up, according to the instruction, for the first user, a channel for bearing the control channel signal of the first signal; and the control signal detecting unit 63 is configured to process the control channel signal which is of the first signal and is borne by the channel, and generate a detection result of the control channel signal which is of the first signal and is borne by the channel, so that the signal processing entity supporting the real-time power control function performs real-time power control on the first user according to the detection result.

The result of processing, by the signal processing entity 6, the control channel signal of the first signal sent by the first user is a control channel detection result; there may be multiple manners for performing power control on a user according to the control channel detection result, for example, by referring to the prior art, a signal-to-noise ratio generated according to the control channel detection result may be compared with a target signal-to-noise ratio to generate a gain coefficient, and the gain coefficient is configured to a user equipment, so as to implement real-time adjustment of sending power of the user, thereby improving signal quality, which is not repeatedly described herein.

The embodiment of the present invention provides the signal processing entity, where a channel for performing power control on a user is set up, in a signal processing entity supporting a real-time power control function, for the user who accesses a signal processing entity not supporting the real-time power control function, so as to adjust transmit power of the user in real time, and improve performance of power control on the user who accesses the signal processing entity not supporting the real-time power control function, thereby reducing an impact of channel fading on power detection performance of the user signal.

Figure 7:
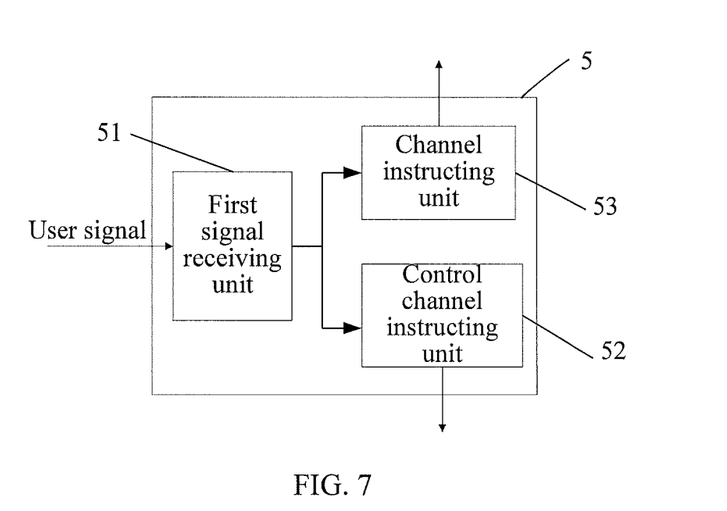
FIG. 7 is a schematic structural diagram of a control apparatus according to another embodiment of the present invention.

Further, optionally, as shown in FIG. 7, the control apparatus 5 further includes: a channel instructing unit 53;

the channel instructing unit 53 is configured to send, according to the second signal sent by the first user, an instruction for processing each channel signal of a third signal to the signal processing entity not supporting the real-time power control function, so that the signal processing entity not supporting the real-time power control function processes each channel signal of the third signal sent by the first user, where the third signal is a signal sent by the first user to the signal processing entity not supporting the real-time power control function.

Figure 8:
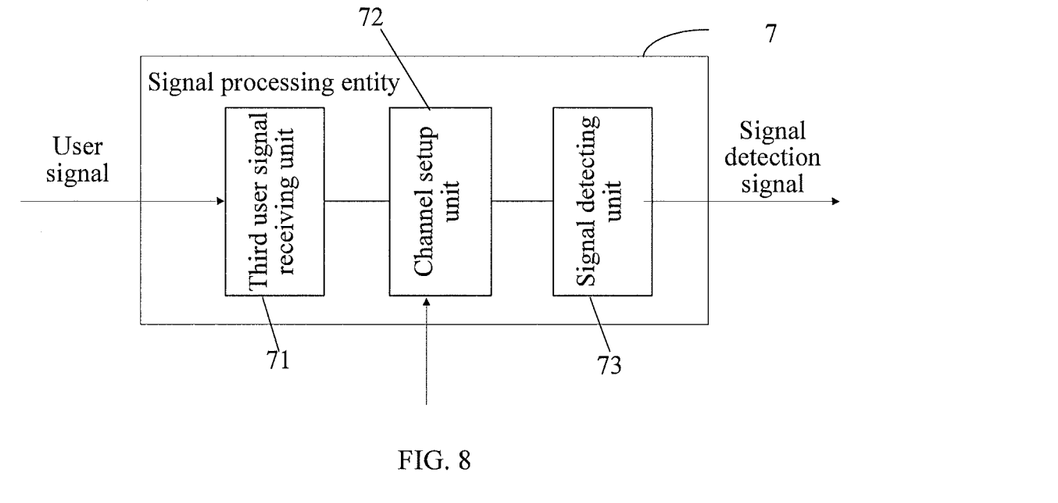
FIG. 8 is a schematic structural diagram of a signal processing entity not supporting a real-time power control function according to another embodiment of the present invention.

FIG. 8 shows a signal processing entity 7 provided by an embodiment of the present invention, where the signal processing entity 7 is a signal processing entity not supporting a real-time power control function, and includes: a third user signal receiving unit 71, a channel setup unit 72, and a signal detecting unit 73, where:

the third user signal receiving unit 71 is configured to receive a third signal sent by a first user, where the first user is a user who accesses the signal processing entity not supporting the real-time power control function, and the third signal is a signal sent by the first user to the signal processing entity not supporting the real-time power control function;

the channel setup unit 72 is configured to receive an instruction which is for processing each channel signal of the third signal and is sent by a control apparatus, and set up, for the first user, channels respectively for bearing each channel signal of the third signal; and the signal detecting unit 73 is configured to process each channel signal which is of the third signal and is borne by each of the foregoing channels.

The signal processing entity 7 is the signal processing entity not supporting the real-time power control function, and the signal processing entity 7 is connected to the channel setup unit 53 of the control apparatus 5; the signal processing entity 7 processes all channel signals of the third signal sent by the first user, and a processing result is a signal detection signal. The signal processing entity 7 simultaneously processes a control channel signal and a data channel signal of the third signal sent by the accessing first user, and a processing result of the control channel signal of the third signal is used to demodulate the data channel signal but not used for power control.

Figure 9:
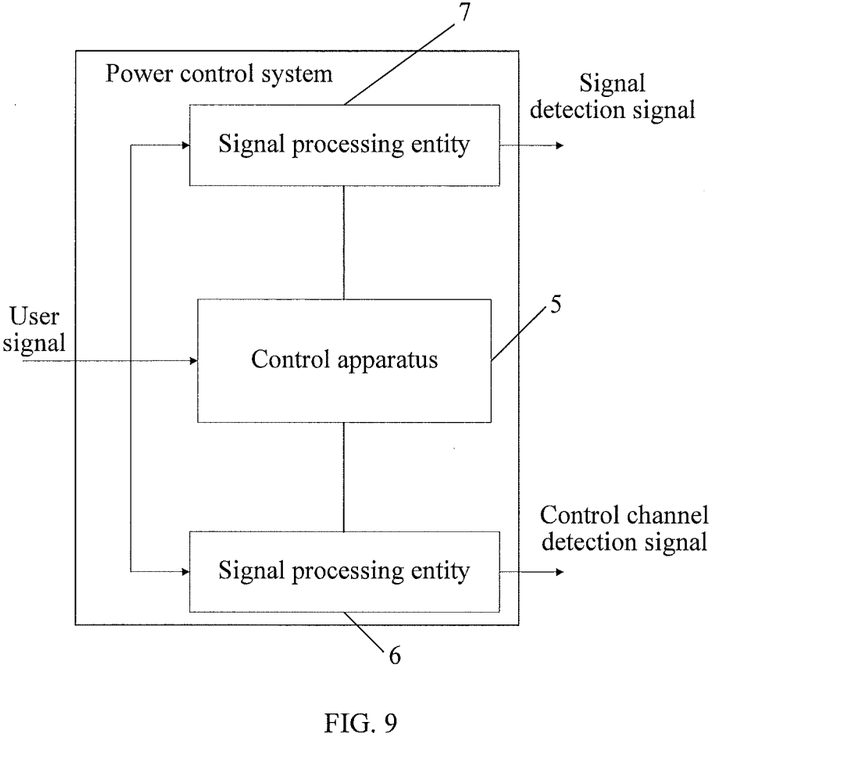
FIG. 9 is a schematic structural diagram of a power control system according to an embodiment of the present invention.

The following is a power control system provided by an embodiment of the present invention, where the system may be applied in the apparatus provided by the foregoing embodiments; the power control system provided by the embodiment of the present invention, as shown in FIG. 9, includes: the foregoing control apparatus 5, signal processing entity 6, and signal processing entity 7; for structures and specific implementation manners of the control apparatus 5, signal processing entity 6, and signal processing entity 7, reference may be made to relevant description in the foregoing embodiments.

The embodiment of the present invention provides the power control system, where a channel for performing power control on a user is set up, in a signal processing entity supporting a real-time power control function, for the user who accesses a signal processing entity not supporting the real-time power control function, so as to adjust transmit power of the user in real time, and improve performance of power control on the user who accesses the signal processing entity not supporting the real-time power control function, thereby reducing an impact of channel fading on power detection performance of the user signal. It can be understood that, the power control system may be a base station.

It can be understood that, the foregoing signal processing entity 7 not supporting the real-time power control function and the signal processing entity 6 supporting the real-time power control function may respectively be a board, and the control apparatus may be a module that can implement corresponding functions and is independent of the signal processing entity not supporting the real-time power control function and the signal processing entity supporting the real-time power control function; the control apparatus may also exit in other manners as long as it can implement the corresponding functions in the embodiment of the present invention, which is not limited by the embodiment of the present invention.

A person of ordinary skill in the art may understand that, all or a part of the steps implementing the foregoing method embodiments may be accomplished by a program instructing relevant hardware. The foregoing programs may be stored in a computer readable storage medium. When the program runs, the steps of the foregoing method embodiments are performed. The foregoing storage medium includes various mediums capable of storing program codes, such as a ROM, a RAM, a magnetic disk, or an optical disk.

The foregoing description is merely specific implementation manners of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal processing entity, wherein the signal processing entity supports a real-time power control function, and the signal processing entity comprising:
at least one hardware processor configured to:
receive a first signal sent by a first user, wherein the first user is a user who accesses a signal processing entity not supporting the real-time power control function, and the first signal is a signal sent by the first user to the signal processing entity supporting the real-time power control function;
receive an instruction which is for processing a control channel signal of the first signal and is sent by a control apparatus, and set up, according to the instruction, for the first user, a channel for bearing the control channel signal of the first signal; and
process the control channel signal which is of the first signal and is borne by the channel, and generate a detection result of the control channel signal which is of the first signal and is borne by the channel, so that the signal processing entity supporting the real-time power control function performs real-time power control on the first user according to the detection result.

* * * * *